US008266311B2

(12) United States Patent
Virdi et al.

(10) Patent No.: US 8,266,311 B2
(45) Date of Patent: Sep. 11, 2012

(54) STRATEGIES FOR TRANSMITTING IN-BAND CONTROL INFORMATION

(75) Inventors: Gurpratap Virdi, Bellevue, WA (US); Jeffrey A. Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 2038 days.

(21) Appl. No.: 10/901,682

(22) Filed: Jul. 29, 2004

(65) Prior Publication Data
US 2006/0026293 A1 Feb. 2, 2006

(51) Int. Cl.
G06F 15/16 (2006.01)
(52) U.S. Cl. .......................... 709/231; 711/147; 370/235
(58) Field of Classification Search .................. 709/231, 709/232, 206, 207, 225; 711/3, 118, 147; 370/231, 232, 235
See application file for complete search history.

(56) References Cited

U.S. PATENT DOCUMENTS

| 5,504,823 | A | 4/1996 | Yoon |
| 5,652,627 | A | 7/1997 | Allen |
| 5,737,552 | A | 4/1998 | Lavallee et al. |
| 6,674,858 | B1 | 1/2004 | Kimura et al. |
| 6,742,082 | B1 * | 5/2004 | Lango et al. ................. 711/118 |
| 6,747,991 | B1 | 6/2004 | Hemy et al. |
| 6,795,863 | B1 * | 9/2004 | Doty, Jr. ....................... 709/231 |
| 7,471,834 | B2 | 12/2008 | Sull et al. |
| 2002/0059638 | A1 * | 5/2002 | Oz et al. ........................ 725/129 |
| 2002/0116471 | A1 | 8/2002 | Shteyn |
| 2003/0196202 | A1 | 10/2003 | Barrett et al. |
| 2003/0222843 | A1 | 12/2003 | Birmingham |
| 2003/0226151 | A1 | 12/2003 | Hamada et al. |
| 2004/0165863 | A1 | 8/2004 | Johnson |
| 2004/0194134 | A1 | 9/2004 | Gunatilake et al. |
| 2005/0094733 | A1 | 5/2005 | Daniell |

FOREIGN PATENT DOCUMENTS

| CN | CN1256583 | 6/2000 |
| JP | 11500289 | 1/1999 |
| JP | 2000059328 A | 2/2000 |
| JP | 2002077811 A | 3/2002 |
| JP | 2002112194 A | 4/2002 |
| JP | 2002252844 A | 9/2002 |
| JP | 2004350043 A | 12/2004 |
| WO | WO0119088 A | 3/2001 |
| WO | WO03032638 A | 4/2003 |

OTHER PUBLICATIONS

Media Center Extender description, available at <http://wvw.microsoft.com/windowsxp/mediacentedevaluation/devices/extender.mspx>, published on Jan. 7, 2004, accessed on Jul. 28, 2004, 2 pages.

Linksys introductory web page, available at <http://www.linksys.com/splash/wmal11b_splash.asp>, accessed on Jul. 28, 2004, 1 page.

(Continued)

Primary Examiner — Thuong Nguyen
(74) Attorney, Agent, or Firm — Lee & Hayes, PLLC

(57) ABSTRACT

Strategies are described for transmitting control information from a host module to a client module. The host module transmits the control information in-band along with a stream of media content information packets. The control information can be used to govern the operation of the client module. In one case, the control information alerts the client module to a discontinuity in streams, which may be the result of the user changing channels via the host or client module, etc., issuing a seek instruction, and so forth. Transmitting the control information in in-band fashion is advantageous because it reduces the need for complex linking between the control information and the associated content information.

22 Claims, 8 Drawing Sheets

OTHER PUBLICATIONS

BroadQ introductory web page, available at <http://www.broadq.com/qcast2.htm>, accessed on Jul. 28, 2004, 2 pages.

Mediabolic introductory web page, available at <http://www.mediabolic.com/products/sampleproducts/networkedavreceivechtml>, accessed on Jul. 28, 2004, 1 page.

Jack Brassil and Henning Schulzinne, "Structuring Internet Media Streams With Cueing Protocols," IEEE/ACM Transactions on Networking, vol. 10, No. 4, Aug. 2002, pp. 466-476.

"Microsoft Windows Media Center Extender Technology Delivers Digital Entertainment and the Media Center Experience to Any Screen in the House," accessible at <http://www.microsoft.com/presspass/press/2004/Jan04/01-07eHomeCES2004PR.asp>, dated Jan. 7, 2004, accessed on Jul. 28, 2004, 4 pages.

The Chinese Office Action mailed Dec. 12, 2011 for Chinese patent application No. 200510129162.6, a counterpart foreign application of U.S. Appl. No. 10/901,682, 6 pages.

The Chinese Office Action mailed Feburyar 16, 2012 for Chinese patent application No. 200510129162.6, a counterpart foreign application of U.S. Appl. No. 10/901,682, 6 pages.

Translated the Chinese Office Action mailed Sep. 6, 2011 for Chinese patent application No. 200510129162.6, a counterpart foreign application of U.S. Appl. No. 10/901,682, 10 pages.

Translated the Japanese Office Action mailed Jan. 21, 2011 for Japanese Patent Application No. 2005-215764, a counterpart foreign application of U.S. Appl. No. 10/901,682, 4 pages.

Translated the Japanese Office Action mailed Dec. 2, 2011 for Japanese patent application No. 2005-215764, a counterpart foreign application of U.S. Appl. No. 10/901,682, 6 pages.

The Korean Office Action mailed Oct. 19, 2011 for Korean patent application No. 10-2005-68778, a counterpart foreign application of U.S. Appl. No. 10/901,682, 4 pages.

* cited by examiner

STRATEGIES FOR TRANSMITTING IN-BAND CONTROL INFORMATION

TECHNICAL FIELD

This subject matter pertains to strategies for transmitting control information, and, in a more particular implementation, to strategies for transmitting control information from a host to a client in a media presentation environment.

BACKGROUND

Computers are becoming an increasingly popular mechanism for presenting media content information, such as audio information and video information. For instance, a user can receive content information from a remote source using a personal computer in the user's home that is coupled to the remote source via a network. The user may receive the content information as a complete file or in piecemeal streaming fashion. Alternatively, if the computer includes a tuner mechanism, the user may receive content information from conventional broadcast sources (such as cable or satellite sources) by tuning to these sources. The user may forward such content information to one or more appropriate playback devices in the home, such as a television or stereo system. Microsoft Corporation's Media Center technology provides one exemplary suite of tools for receiving and presenting media content information in the above-described manner. Using other tools, the user may couple multiple playback devices in the home into a presentation network. The user can then transfer media information from one device to another within the home. Universal Plug and Play (UPnP) technology provides one suite of tools for conveniently setting up such a home network.

While these developments offer many interesting enhancements over the conventional presentation of media information, they also present a number of new challenges. For instance, in addition to transmitting media content information between computers, it may also be necessary to transmit control information. For instance, a host device may forward control information that instructs a receiving device how it should process the media content information. This can become problematic in a networked environment. For instance, networking and processing anomalies may result in cases where the receiving device receives media content information without its associated control information, or vice versa.

There is accordingly a need for more efficient techniques for transmitting control information in any environment, such as the above-described media presentation environment.

SUMMARY

According to one exemplary implementation, a method is described for streaming content information from a host module to a client module. The method comprises: (a) forming, at the host module, units of content information for inclusion in a stream to be transmitted to the client module; (b) forming, at the host module, at least one unit of control information for inclusion in the stream; (c) inserting, at the host module, said at least one unit of control information among the units of content information, wherein the position of said at least one unit of control information vis-à-vis the units of content information conveys instructions regarding the manner in which the client module is to operate upon receiving the control information; and (d) transmitting, by the host module, the stream containing the units of content information and said at least one unit of control information to the client module, wherein the host module dynamically varies the control information that it inserts in the stream based on actions taken by a user who controls the playback of the stream.

Additional exemplary implementations are described in the following.

Figure 1:
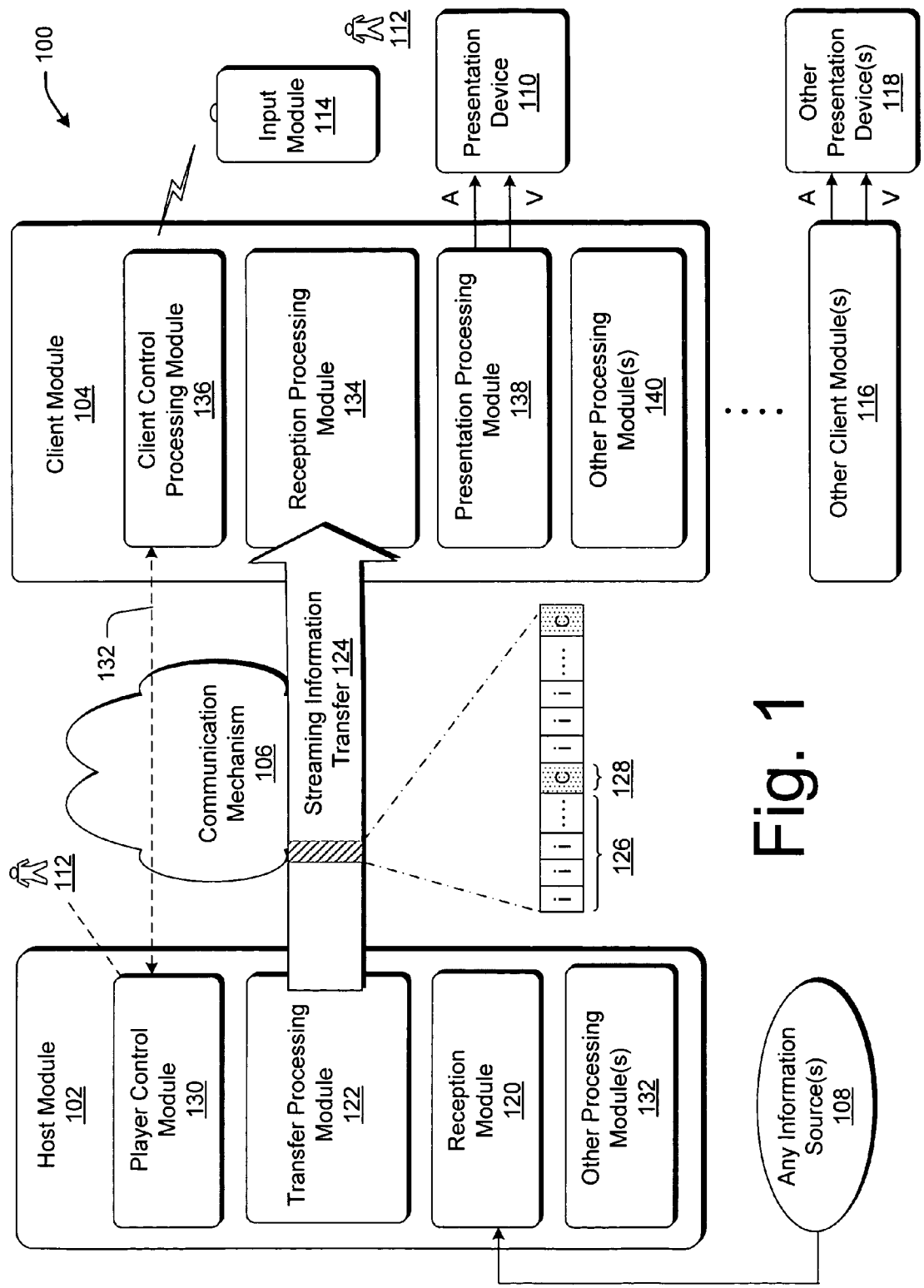
FIG. 1 shows an exemplary system for implementing aspects of the features summarized above.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following describes exemplary mechanisms and procedures for transmitting control information from a host module to a client module. The mechanisms and procedures send the control information in-band, that is, in the same communication band as the media content information. More specifically, the mechanisms and procedures position the control information in a stream of content information to establish a nexus between the control information and the content information.

The control information may convey any information regarding the content information. For instance, where the control information is inserted at the end of a stream, it may convey end of stream information that identifies the end of the stream. Where the control information is inserted at the start of stream, it may convey information regarding a stream which follows the control information in time. For instance, in this scenario, the control information may indicate that the following stream should be processed using a prescribed decryption key, or using prescribed rendering resources at the client module. Where the control information is positioned between two streams of content information, it may convey information regarding the relationship of one stream to another. For instance, in this scenario, the control information may indicate that there is a discontinuity between the two streams. There are additional applications of this control information transfer paradigm, to be described below.

As to terminology, the term "media content information" (or "content information" for brevity) can pertain to any kind of resources that can be consumed by a user in any format, such as audio resources (e.g., music, etc.), still picture resources (e.g., digital photographs, etc.), moving picture resources (e.g., television programs, movies, etc.), computer programs (e.g., games, etc.), markup language resources (e.g., hypertext markup language resources received via a wide area packet network), and so on. The information can be expressed in analog form or digital form or a combination of analog and digital forms. The information can also include (or can omit) interactive content (as in the case with computer games).

The term control information refers to any information which has any kind of bearing on the content information. For example, the control information may describe some property of the content information, or may describe the behavior of some processing to be performed on the control information. The term "control event" refers to any kind of event which invokes the creation of control information. A user may trigger such an event by invoking express input actions (e.g., using a remote control or other input mechanism). Or the system may automatically generate a control event when certain conditions are met. The term "control processing task" refers to an operation that is performed upon the occurrence of a control event.

This disclosure includes the following sections. Section A describes an exemplary system for implementing the features summarized above. Section B describes an exemplary flowchart which shows the operation of the system of Section A. And section C describes an exemplary computer environment for implementing the system of Section A.

A. Exemplary System

A.1. Overview of System

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the terms "module," "functionality," or "logic" represent program code that performs specified tasks when executed on a processing device or devices (e.g., CPU or CPUs). The program code can be stored in one or more fixed and/or removable computer readable memory devices. The features of the techniques described below are platform-independent, meaning that they can be implemented on any commercial computing platform or networking strategy.

FIG. 1 shows an exemplary system 100 for performing the operations described above. The system 100 includes a host module 102 coupled to a client module 104 via a communication mechanism 106. Among other roles, the host module 102 serves to provide media content information and control information to the client module 104 for presentation thereat. The host module 102 may obtain the media content information from any source 108. The client module 104 may present the content information—in accordance with the control information—on any presentation device 110. A user 112 may interact with the client module 104 and/or the host module 102 via any kind of input mechanism, such as input module 114 (such as a remote control device or a keypad associated with the client module 104 or the presentation device 106). FIG. 1 additionally shows that one or more other client modules 116 may receive content information from the host module 102 and present such information on one or more other presentation devices 118.

The infrastructure shown in FIG. 1 can be applied to many different environments. In one case, the host module 102 represents a general purpose computer device within the home of the user 112 (or within some other local environment). The host module 102 can receive content information from any source 108, such as a local source (e.g., as implemented by a hard drive of the computer device, a local video jukebox, a local video camera, a local microphone, and so forth), or from a remote source. One remote source can represent traditional television and radio broadcast sources, such as a traditional wired sources (e.g., cable) or traditional wireless sources (such as an earthbound antenna or a satellite). Another remote source can represent a server or like device coupled to the host module 104 via a network, such as a TCP/IP network (e.g., the Internet). Still other kinds of sources can provide content information to the host module 102.

Any kind of business arrangement can govern the dissemination of content information to the host module 102. The sources 108 can distribute the resource information on a fixed time schedule or in an on-demand fashion. The sources 108 can charge a fee to receive the content information, or can distribute this information free of charge.

Likewise, the content information itself can have many forms. The content information may represent live content information or pre-recorded content information. The content information can have an audio component and/or a visual (video) component and/or an interactive component. The content information can represent static information (as in the case of one or more photographs), or "moving" information (such as in video). The content information can be expressed in any format, such as MPEG-1, MPEG-2, or WMV for video information (among other formats), and MP3, WMA, or WAV (among other formats) for music information. The content information can be expressed in digital form, analog form, or a combination of analog and digital forms. Still other kinds of source formats can be received.

In one exemplary implementation, the client module 104 can represent another kind of computer device located in the user 112's home. For instance, the client module 104 may represent another general purpose computer device. Or the client module 104 can represent a special-purpose computer device, such as a game console or an extension console designed for the main purpose of receiving content information from the host module 102 (and thereby "extending" the number of output devices that the host module 102 can direct content information to within the home). Or the client module 104 can represent logic functionality integrated within the presentation device 110 itself.

In an exemplary home application, the user 112 may have situated several of the client modules 104 in different respective rooms of the home, which in turn are coupled to different media presentation devices located in these rooms. Each of these client modules can be configured to receive content information from the host module 102. Where these client modules 104 are implemented as "extensions" to the host module 102, they may be configured to run several instances of the functionality provided by the host module 102. The system 100 can be further configured to allow concurrency in use among the separate components of the system 100. For instance, a first user may use the host module 102 to perform a first task while a second user uses the client module 104 to perform a second task, without necessarily interfering with the first user.

The presentation device 110 can represent any type of device whereby a user can consume the content information. Possible types of presentation devices 110 include televisions, radios, stereo systems, computer monitors, and so forth.

The communication mechanism 106 can represent any conduit for transmitting information from the host module 102 to the client module 104. In a local environment, the communication mechanism 106 can be implemented as a Local Area Network (LAN), such as an Ethernet network. Any protocol or combination of protocols can be used to forward information from the host module 102 to the client module 104, such as the TCP/IP protocols. The communication mechanism 106 can be physically implemented using any combination of physical components, such as various wired communication paths (cooper wire, power line, fiber optic, etc.) and various wireless communication paths. Although not shown, the communication mechanism 106 can also incorporate various routers, name servers, gateways, and so forth.

Figure 9:
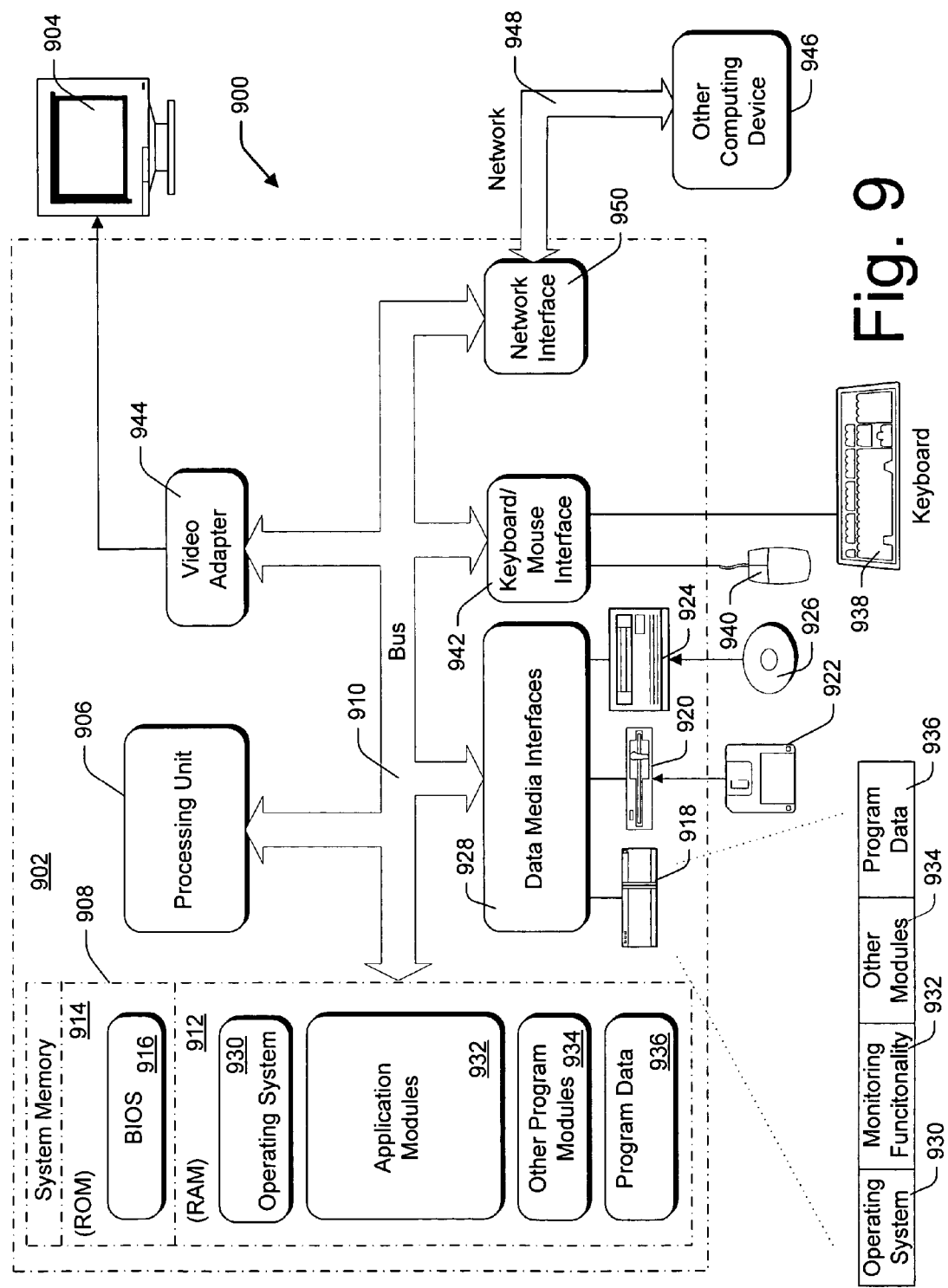
FIG. 9 shows an exemplary computing environment for implementing aspects of the system shown in FIG. 1.

The above-described environment is exemplary and non-limiting. In another application, the host module 102 can represent a server type of computer or a peer computer that is remote with respect to the client module 104. For instance, the host module itself 102 can represent a server computer outside the home that provides content information to the client module 104 over the Internet or some other network. Still other applications are possible; the host module 102 is to be understood as any source of content information wherever situated and however implemented, and the client module 104 is to be understood as any recipient of content information wherever situated and however implemented. FIG. 9, to be discussed below in turn, provides further details regarding one implementation of the host module 102 or the client module 104 using an appropriately configured general purpose computer device (e.g., a personal computer, etc.) or special purpose computer device (e.g., a game console, an extension device, etc.)

With the above overview, attention will now be directed to the individual exemplary components of the host module 102 and the client module 104.

To begin with the host module 102, a reception module 120 receives information from the information source 108. The reception module 120 can represent a tuner which tunes to a physical frequency associated with the information source 108, or can represent multiple tuners that can simultaneously tune to multiple sources. Alternatively, or in addition, the reception module 120 can represent a network interface module (such any kind of modem) which receives content information from a digital network source.

Figure 2:
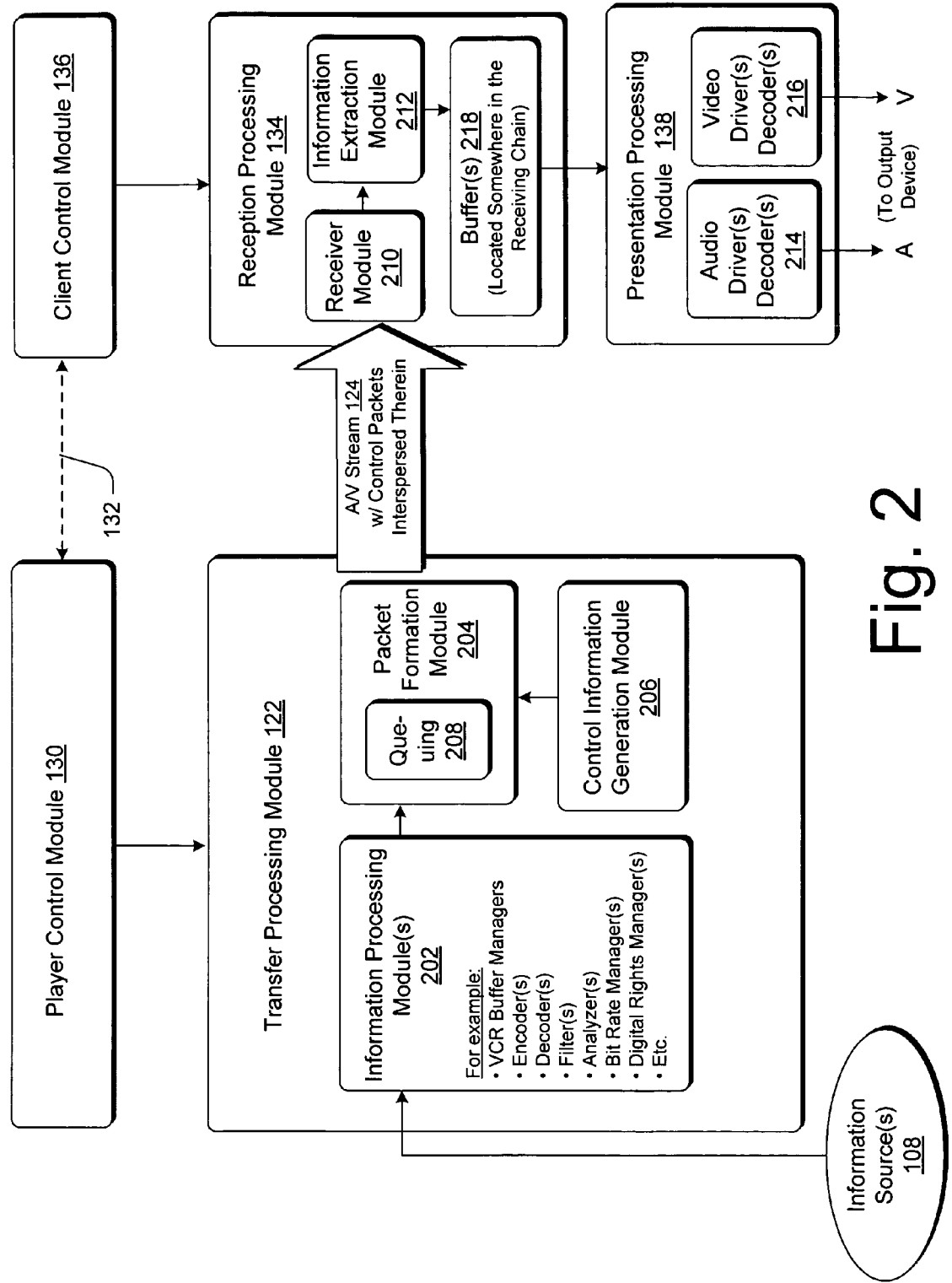
FIG. 2 shows a more detailed block diagram of selected components of the system of FIG. 1.

A transfer processing module 122 performs a variety of processing tasks on the content information to format it for transmission over the communication mechanism 106 to the client module 104, and then transmits such information. FIG. 2 describes an exemplary composition of the transfer processing module 122. Suffice it to say at this juncture in the discussion that the transfer processing module 122 can filter and/or analyze the content information to prepare it for transmission, adjust the bit rate of the information, assemble the information into packets, multiplex the packets into a transmission stream for output to the communication mechanism 106, and so forth.

FIG. 1 represents the transmission of information content as stream 124. A stream refers to the transmission of content information in piecemeal fashion, such that the client module 104 can receive and render part of the content information without receiving the entire body of such information (as opposed to the transmission of a file containing the complete content information). The stream 124 can include a plurality of units 126 (e.g., packets) that primarily convey the content information, that is, in the case of an A/V resource, the actual audio and visual data. The stream 124 can also include one or more control units 128 (e.g., packets) dispersed in the stream of content information 126. The position of the control packets 126 within the stream 124 conveys information regarding how the control information contained therein is to be applied to the content information. (The "position" may be reflected by the sequence numbers assigned to the packets within the stream 124, rather than the physical ordering of packets in an actual transmitted stream; this is because, in a packet network, it can be expected that some packets will be received "out of order," requiring the client module 104 to reassemble them in the proper order.) For instance, the exemplary control packet 128 may convey the fact that the content information stream that preceded it in time has come to an end. Or the exemplary control packet 128 may convey the fact that prescribed processing behavior should be applied to the content information 126 which follows it in time. Or the exemplary control packet 128 may convey that there is a discontinuity between the content information which precedes it and the content information 126 which follows it. Still other applications and interpretations of the control packet 128 are envisioned. Section A.2 (below) provides further details regarding the generation and processing of control information.

A player control module 130 controls the components in the host module 102. For instance, the control module 130 can set up a communication session with the client module 104 and then control the state of the client module 104 across multiple potential player instances. This module 130 can also play a role in coalescing control processing tasks that meet certain criteria (as will be described below).

The player control module 130 can also forward control instructions to the client module 104 via a separate communication path 132. Thus, the control information sent on path 132 supplements the control information sent in-band within the stream 124 (or, in another interpretation, it can be said that the control information sent in-band supplements the control information forwarded on communication path 132). According to one exemplary design paradigm, the control information can be sent in-band in those circumstances where it is important to convey the timing (or positional alignment) of this information vis-à-vis the content information. Exemplary circumstances in which in-band transmission of control information is appropriate are described with reference to FIGS. 4-6 (to be discussed below in turn). The communication path 132 can be used to communicate control event information which does not need to be conveyed in as precise a temporal/positional manner as the in-band control information. Generally, different applications can use different communication channels to communicate different control events depending on the unique requirements of these applications. The communication path 132 can employ a different communication mechanism and/or protocol than used by the communication mechanism 106, or it can use the same mechanism and protocol.

Still additional control paths can be included. For instance, the host module 102 can use another control path (not shown) to control the display of graphical and metadata-related information on the client module 104. For instance, this control channel can be used to coordinate the display of various menus, program bars, channel information, and so forth on the presentation device 110. One exemplary and non-limiting protocol that can be used to accomplish this task is the Remote Desktop Protocol (RDP). This protocol allows the system 100 to essentially "project" the graphical functionality associated with the host module 102 onto the presentation device 110 via the client module 104. However, this strategy is exemplary rather than limiting; other techniques can be used to forward graphical information to the presentation device 110. Generally, metadata-related information and graphical information can originate from the host module 102, and/or the client module 104, and/or the presentation device 110, and/or some other module; further, any module or combination of modules can be used to coordinate the display of this metadata-related information and graphical information.

Finally, the host module 102 can include a number of other modules 132 for performing other unspecified tasks (that are not relevant to the focus of this discussion).

Now addressing the components of the client module 104, the client module includes a reception processing module 134 for receiving the stream 124 and performing processing on the stream. FIG. 2 provides additional details regarding this component 134. Suffice it to say at this juncture of the discussion that this component 134 can demultiplex the information within the stream 124 and extract the information contained therein. The packets can include ID information which identifies their composition—e.g., whether they contain audio information, video information, or control information. In the event that a packet includes control information, the reception processing module 134 performs one or more control operations based on the control information. Further, the reception processing module 134 forwards the content information down to appropriate renderers for presentation of this information. Further, the reception processing module 134, as well as the client control module 136 (to be described below), can control the renderers to perform various operations. The reception processing module 134 can use the in-band control information (e.g., 128) to control the renderers.

A client control processing module 136 also controls the components in the client module 104. The client control processing module 136 also interacts with the player control module 130 to transmit and receive control information over path 132. For instance, the client control module 136 can provide an interface used to transmit various asynchronous events to the player control module 102, such as an end of stream event (indicating that the client module 104 has reached the end of the stream 124), a pause event (indicating that the user 112 has paused the presentation of content information), a stop event (indicating that the user 112 has stopped the presentation of content information), various error events, and so forth.

A presentation processing module 138 can include various functionality for rendering the content information. For instance, it can include audio drivers, video drivers, etc. The presentation processing module 138 can be implemented as a separate module from the presentation device 110, or can be integrated with the presentation device 110 itself.

Finally, the client module 104 can include a number of other modules 140 for performing other unspecified tasks (that are not relevant to the focus of this discussion).

FIG. 2 shows further details regarding the transfer processing module 122, the reception processing module 134 and the presentation processing module 138.

To begin with, the transfer processing module 122 can include an information processing module 202. The information processing module 202, in turn, can include a suite of processing tools that can be flexibly configured to perform different processing operations on content information received from the information source 108. That is, different collections and combinations of such tools can be selected based on the type of content information that is received, and based on what kind of output format is desired, and so forth. Exemplary such tools can include:

Buffer managers that provide personal video recorder (PVR) type functionality, such as the ability to record content information, pause the content information, jump to different locations within the content information, and so forth.

Various encoders for encoding the content information into a desired format, or decoders for decoding the content information that is expressed in a given format.

Various content filters and analyzers for modifying the content information to improve the quality of presentation of the content information at the client module 104. Different applications can adopt a different collection of such filters and analyzers (or can entirely omit such filters and analyzers) depending on the characteristics and demands of the particular applications.

Various rate filters that control the bit rate of the steam 124. For instance, one such filter can lower the bit rate when the available network bandwidth drops because of congestion or interference. This filter can lower the bit rate by re-encoding the stream or dropping frames, etc.

Various digital rights management (DRM) filters for encrypting the content for transmission over the control mechanism 106, and for performing other rights management functions.

Figure 3:
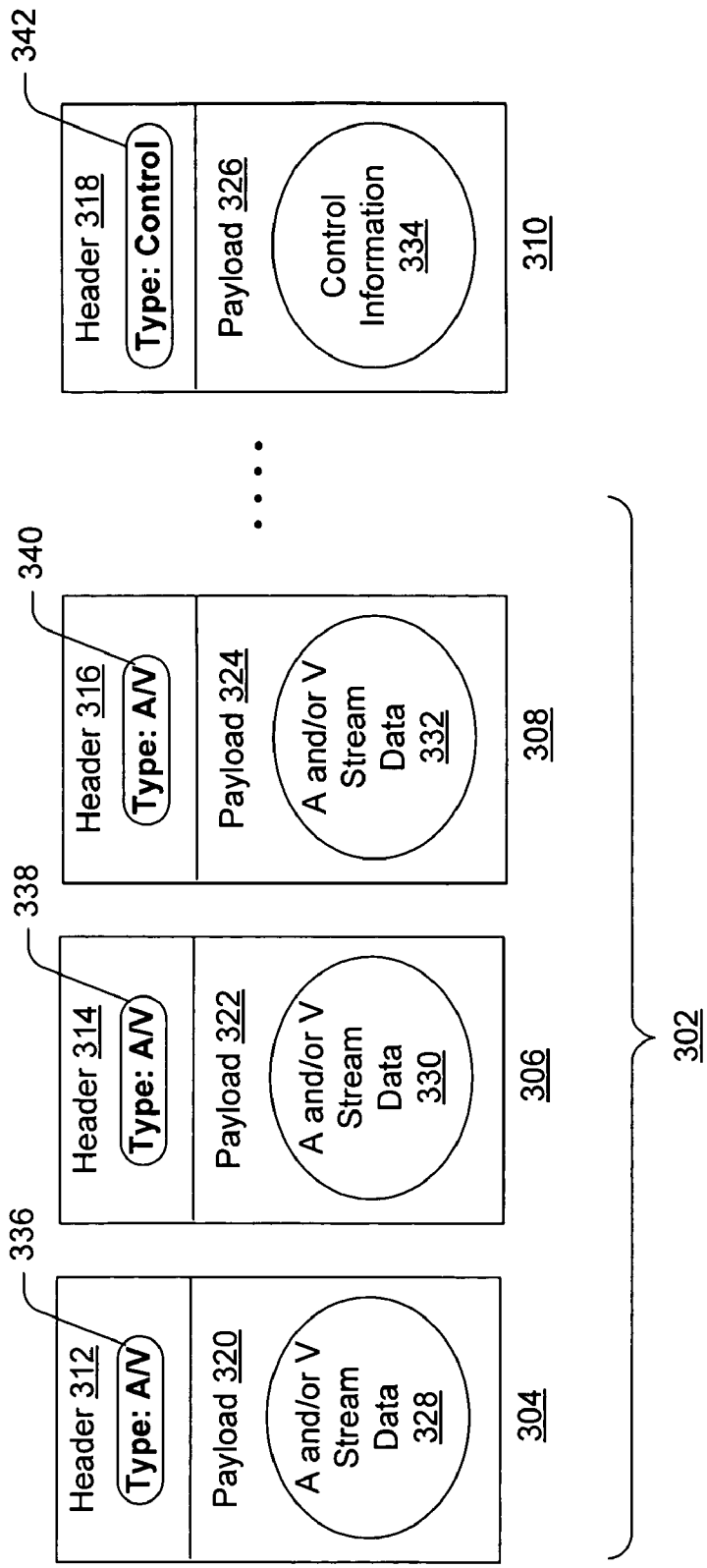
FIG. 3 shows an exemplary series of packets that can be transmitted using the system of FIG. 1, where the packets include control information dispersed among content information.

A packet formation module 204 receives an output from the information processing module 202 and places this output into a form suitable for transmission over the communication mechanism 106. The packet formation module 204 can use any protocol to process the content information. To provide one non-limiting illustration, FIG. 3 shows the creation of a number of packets. A stream 302 can be formed by starting with a sequence of key frames and delta frames. A key frame represents a stand-alone representation of a video frame that can be used to reconstruct the video without reference to other frames. The delta frames can be used to predicitvely reconstruct a video frame based on other information in the sequence. A serialized stream is formed from the above-described data, containing video, audio, and other information. A packetized stream is then formed by breaking the serialized stream into packets. Each packet can include a header and a payload. Finally, packets can be further multiplexed into groups and sent over the communication mechanism 106 as a transmission stream. A number of standards can be used to implement the above concepts, including, but not limited to, MPEG-2, the Real-Time Transport Protocol (RTP), various proprietary standards, and so forth; however, the principles described herein are not wedded to any specific standards.

Referring to FIG. 2, the packet formation module 204 performs the above-described tasks by assembling the packets into groups by multiplexing them. A control information generation module 206 inserts control packets 128 into the stream 124 along with the content packets 126. The packet formation module 204 uses a queue 208 to create and transmit the stream 124. That is, the queue 208 stores packets in an order received and a worker thread (not shown) extracts packets from the queue 208 and combines them with other packets.

Advancing again to FIG. 3, this figure shows an exemplary series of packets (304, 306, 308, ... 310). Each packet (304, 306, 308, ... 310) includes a respective header (312, 314, 316, ... 318) and accompanying payload (320, 322, 324, ... 326). The payloads can include audio information or video information. Further, according to the present system 100, the payloads can also include control information. For instance, payloads 320, 322 and 324 include audio or video information (328, 330, 332), while payload 326 includes control information 334. The headers (312, 314, 316, ... 318) include various identification data (336, 338, 340, ... 342), including an indication of what type of data their respective payloads (320, 322, 324, . . . 326) contain. More specifically, headers 312, 314 and 316 include identification data (336, 338, 340) that indicates that their payloads include audio information or visual information (328, 330, 332), while header 318 includes identification data 342 which indicates that its payload 326 contains control information 334.

Returning to FIG. 2, the reception processing module 134 includes a receiver 210 configured to receive the stream 124. An information extraction module 212 receives an 11 output of the receiver 210 and extracts various fields of information from the received stream 124. For instance, the information extraction module 212 can demultiplex the stream 124 and determine on a packet-by-packet basis whether it contains audio information, video information or control information. This can be performed by investigating the identification data (336, 338, 340, . . . 342) in the headers (312, 314, 316, . . . 318) of the received packets (304, 306, 308, 310). The reception processing module 134 performs appropriate processing on the content of the payloads (320, 322, 324, . . . 326) based on their assessed content. Control information conveyed by control packets can include instructions which govern the behavior of the processing performed by the client module 104.

The reception processing module 134 forwards content information that it has received to the presentation processing module 138. The presentation processing module 138 renders the content information using various decoders and drivers (214, 216), as well as other processing mechanisms.

Finally, FIG. 2 indicates that the client module 104 includes a jitter buffer 218 (referred to as simply a buffer below). The buffer 218 stores a certain amount of content information that it receives from the stream 124 on a first-in-first-out (FIFO) basis. The presentation processing module 138 draws from this buffer 218 when rendering the content information. In the event of a glitch (e.g., a slight interruption) in transmission, the presentation processing module 138 can thereby pull previously received content information from the buffer 218 without the glitch negatively affecting the presentation of the content information. The presentation processing module 138 will, however, suffer performance degradation when it reaches the end of the content information stored in the buffer 218 without receiving more content information from the stream 124, because presentation of additional content information is not possible. Generally, FIG. 2 depicts the buffer 218 as a component of the reception processing module 134; but this buffer 218 can be positioned elsewhere in the chain of modules that act on the received content information. Also, the client module 104 may include plural buffers.

There are various occasions when it is desirable to flush the buffer 218. For instance, when the user jumps from one stream to another stream, the buffer 218 no longer stores useful content information that can be relied on in compensating for network glitches. The client module 204 thus flushes the buffer 218 in these circumstances and refills it with content information taken from the other stream. The client module 204 may flush the buffer 218 upon channel changes (where the user jumps from the stream of one program to the stream of another program), and upon seeks (where the user jumps from one portion of a program to another portion of the same programs (e.g., occurring earlier or later in time).

However, the client module 104 is not the only component in the system 100 that is affected by stream discontinuities. When the user 114 changes a channel, for instance, the client control processing module 136 can inform the host module 102 of this event, and the host module 102 can respond by taking appropriate measures. Namely, for example, the transfer processing module 122 on the host module side also may include information stored within queues as well as configuration settings; this information may need to be flushed upon a break in the stream 124. Accordingly, the host module 102 can also coordinate flushing of relevant information stored in the transfer processing module 122, as well as handling other configuration tasks. The transfer processing module 122 responds to discontinuities by cleanly demarcating such breaks in the stream by inserting various stream boundary information into the stream 124. The reception processing module 134 can then skip packets in the received stream 124 until it receives the stream boundary information.

It is therefore apparent that the interaction between the client module 104 and the host module 102 can be relatively intricate, requiring the exchange of control information, the flushing and refilling of one or more buffers, the reconfiguration of various settings, and so forth. This intricacy can incur an appreciable latency when the user 112 invokes an operation which causes a break in the stream 124. To address this issue, the system 100 can include a coalescing module which reduces the latency in situations in which the user 112 makes multiple control actions within a short period of time. For instance, the coalescing module can come into play by reducing the latency associated with the user repeatedly making a series of channel change commands or seek commands within a relatively short period of time.

A.2. The Generation and Interpretation of In-Band Control Information

Figure 4:
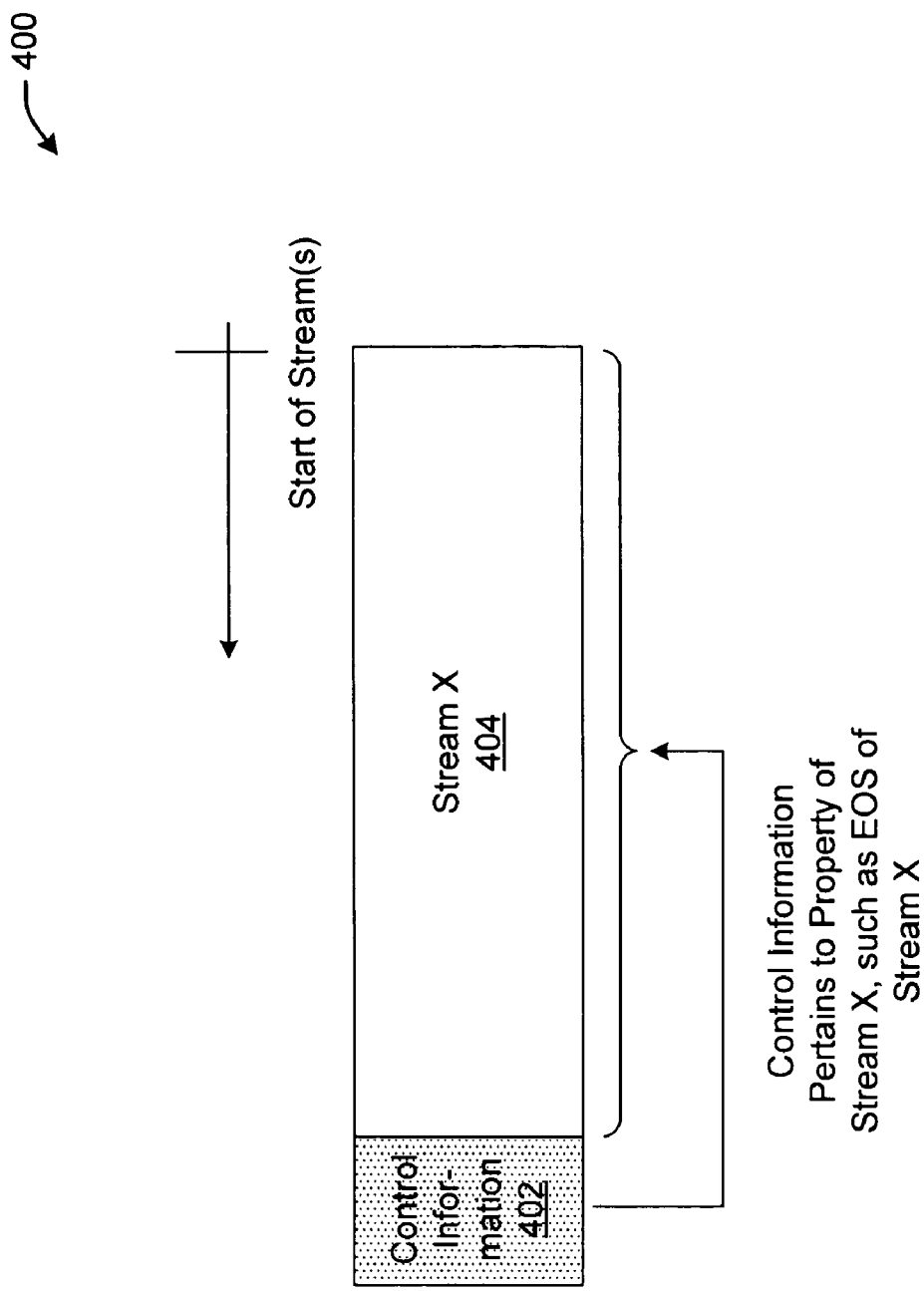
FIGS. 4-6 show three different use scenarios in which the control information conveys different respective instructions pertaining to the content information.
Figure 5:
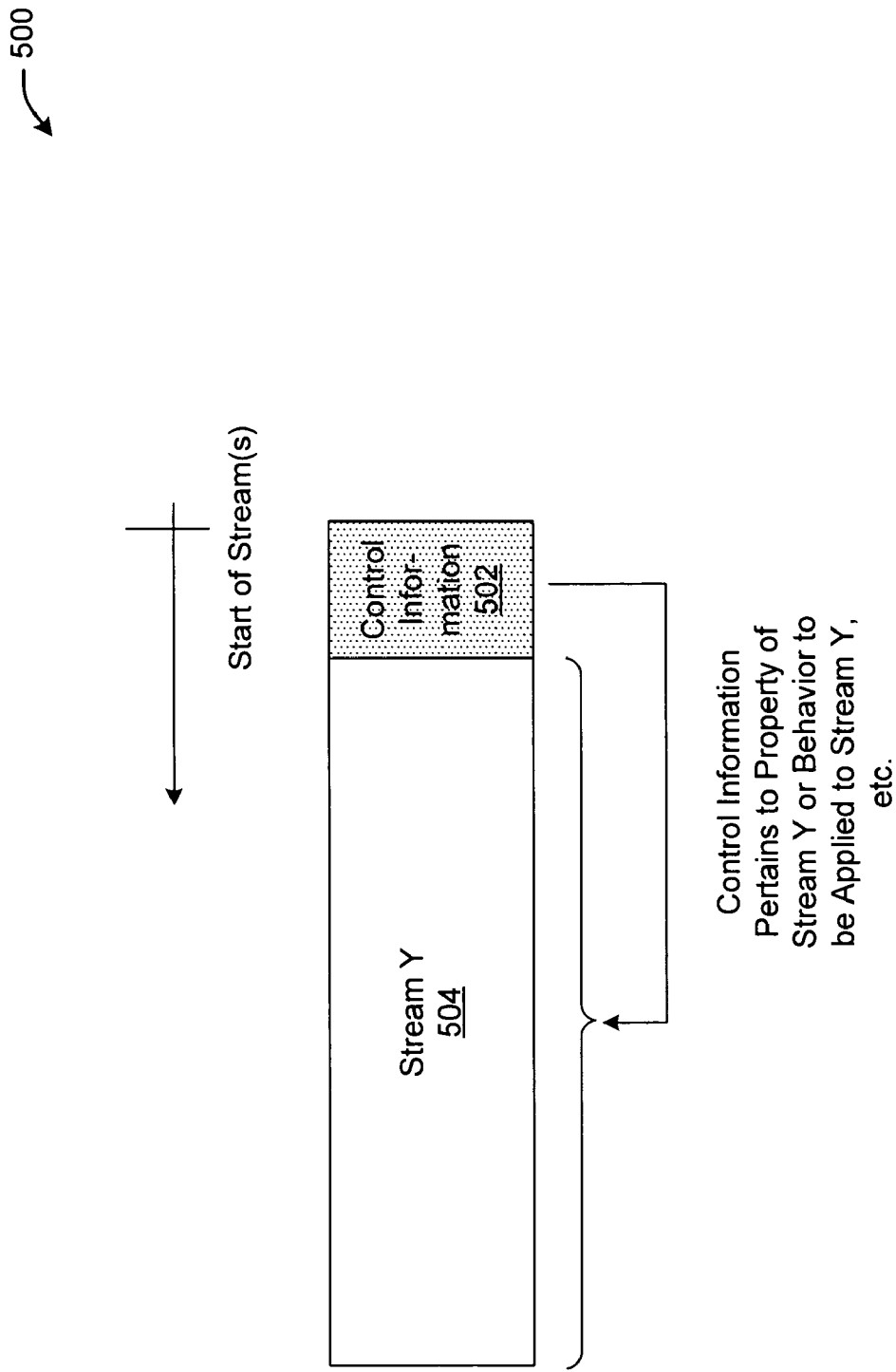
Figure 6:
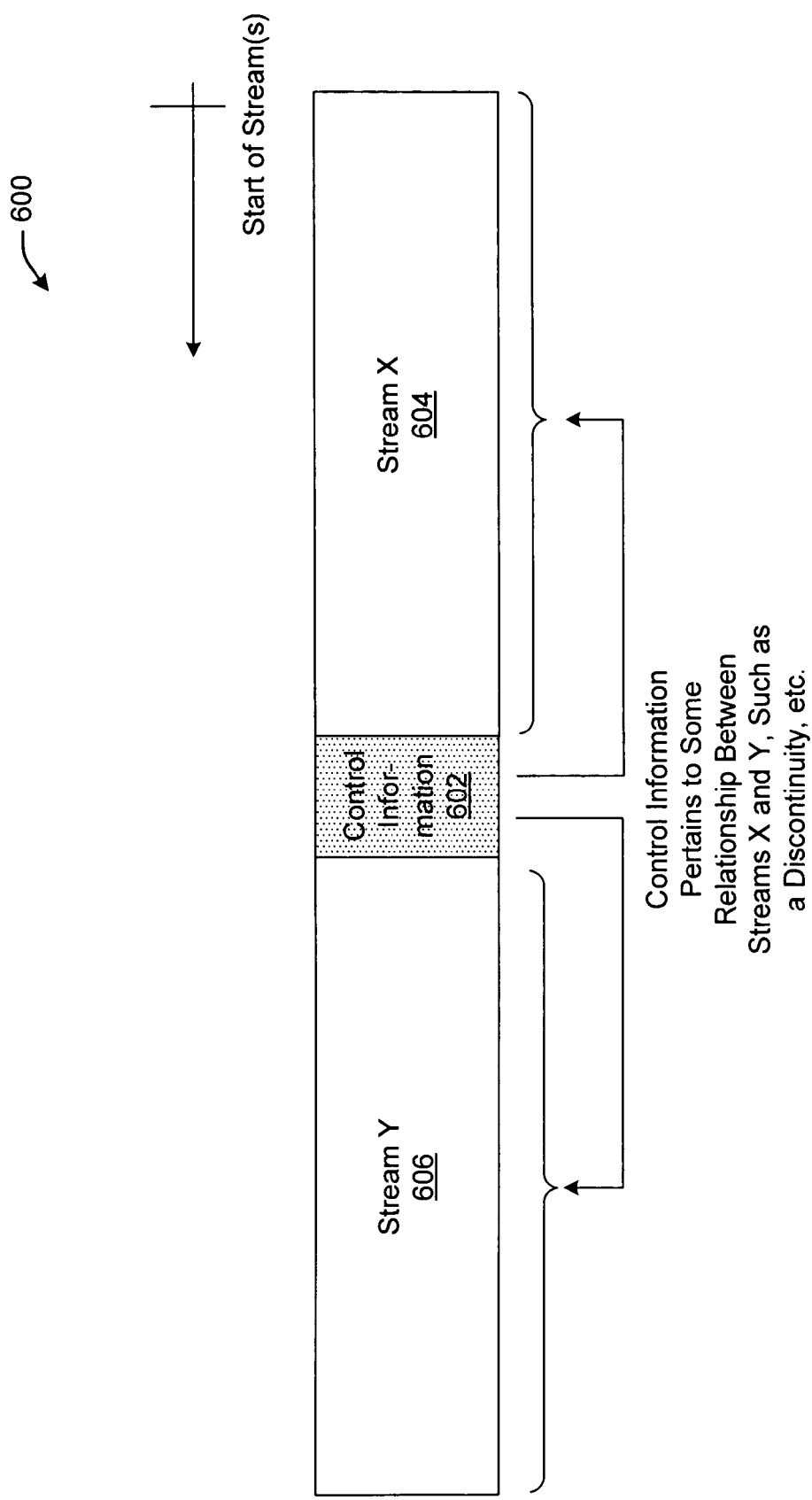

FIGS. 4-6 describe three general scenarios in which a control packet is inserted within a stream of content information to provide instructions to the client module 104 regarding the content information. The instructions may convey information regarding the content information, or may describe processing to be performed on the content information, and so forth. The position of the control packets within the stream of content information is significant because it determines how the client module 104 should apply the control instructions contained therein to the content information. (The "position" of the control packets among a group of packets can be represented by, for example, the sequence numbers assigned to the packets, rather than an actual order of receipt of such packets—because the packets may be received out of order in a typical packet network.)

Beginning with FIG. 4, this figure shows a scenario 400 in which the control information 402 is placed at the trailing end of a content information stream X 404. (Note that, in FIGS. 4-6, the least recently transmitted information appears at the far right of the figures.) This scenario 400 is appropriate to the case where the control information 402 provides information that demarcates the end of the stream (EOS). Positioning EOS control information 402 in-band along with the content information is useful because it enables the reception processing module 134 to know exactly when to take any necessary steps to switch from playback mode to idle mode, and so forth.

FIG. 5 shows another scenario 500 in which the control information 502 is positioned at the beginning of a stream Y 504. This positioning case can be used to convey instructions regarding operations to be subsequently performed by the client module 104 on stream Y 504. One example of this scenario 500 pertains to the change of decryption keys. In a key change, the host module 102 informs the client module 104 that it should use a different key to subsequently decrypt content information that it receives from the host module 102. It can perform this task by sending the new key to the client module 104 in advance over the separate control channel 132. Then the transfer processing module 122 can insert the key change control information 502 into the in-band content information stream 124. The position of the control information 502 as well as control data contained therein informs the reception processing module 134 that it should apply the new key that it has received to interpret stream Y, which follows the control information 502.

Other types of control information 502 placed at the beginning of a stream can be used to inform the reception processing module 134 what rendering resources provided by the client module 104 should be enabled and/or disabled in processing the ensuing stream Y 504. For example, this can be used to disable the digital output of audio if an audio stream is not allowed to be copied in digital form (e.g., in the case of content protection).

FIG. 6 shows another scenario 600 in which the control information 602 is positioned between stream X 604 and stream Y 606. This positioning case can be used to convey information regarding the relationship between stream X 604 and stream Y 606, such as a discontinuity between stream X 604 and stream Y 606. There may be a discontinuity between these streams because of some data loss.

Or the discontinuity may be due to express commands issued by the user 112 via the client module 104, or via the host module 102 (or via some other module), which are forwarded to the host module 102 (e.g., via the control path 132). For instance, this kind of discontinuity may be triggered when the user 112 has switched from one data stream to another due to switching channels, or because the user 112 has switched from one part of a data stream to another part due to issuing a seek command. There can be still other causes of discontinuities.

In any of these cases, the host module 102 can mark the discontinuity by adding control information 602 to the stream 124, where such control information 602 constitutes stream boundary control information. For example, consider the exemplary scenario represented by the following series of actions:

The user 112 issues a channel change command.
Channel change instructions are forwarded to the host module 102 (or are entered directly to the computer device associated with the host module 102).
The host module 102 issues an instruction to flush appropriate buffers in the system 100 to clear out the old content information from the system (associated with the old channel).
The transfer processing module 122 of the host module 102 adds stream boundary control information 602 to the stream 124 to mark the discontinuity between the stream associated with the old channel and the stream associated with the new channel.
The client module 104 receives this stream boundary control information 602 and reacts appropriately. For instance, the host module 102 can, in advance, alert the client module 104 that it will be sending stream boundary control information 602, prompting the client module to set a flag. As a result of this flag, the client module 602 can be configured to discard all received packets until it receives the promised stream boundary control information 602.
Upon receiving the stream boundary control information, the client module 104 proceeds to fill up its buffer with the new channel information and start presenting it when the buffer reaches a prescribed state of fullness.

Generally, there are at least two advantages to embedding control information within the content information stream. First, the client module 104 can receive the control information synchronized with the associated content information, without the need of providing complex supplemental linking information that ties the control information to the content information. Second, sending control information in-band reduces the load imposed on the separate control channel 132, if in fact a specific implementation chooses to use such separate control channel 132.

The control information itself can be expressed in various formats. By way of illustration and not limitation, this information can be expressed using an extension packet within any protocols, such as RTP. The packets can include identification information which identifies the nature of the stream carried by the packet's payload. The identification information can identify that the payload contains audio-visual information, control information, or some other kind of information.

An exemplary format of a control packet is as follows:

```
// Control codes
enum CONTROL_CODES
{
STREAM_BOUNDARY = 0,
STREAM_EOS,
MACROVISION,
ROTATE_KEY
}
union MicrosoftExtensionPacketHeader
{
    struct
    {
        // A control code indicating the type of control packet
        DWORD controlCode      : 16;
        // Length of the payload contained in this control packet
        DWORD payloadLength    : 16;
    } bitField;
    DWORD dwExtPacketHdr;
};
```

The Stream Boundary field indicates a discontinuity in the stream.

The End Of Stream (EOS) field indicates the end of the stream that is being streamed to the client module 104.

The Macrovision field indicates that the payload of this field's packet contains vision control codes appropriate to a certain prescribed mode of operation.

The Rotate Key field indicates that all samples received after this field's packet are encrypted with a new key. The new key can be transmitted over the control channel before this packet is inserted.

B. Exemplary Method of Operation

Figure 8:
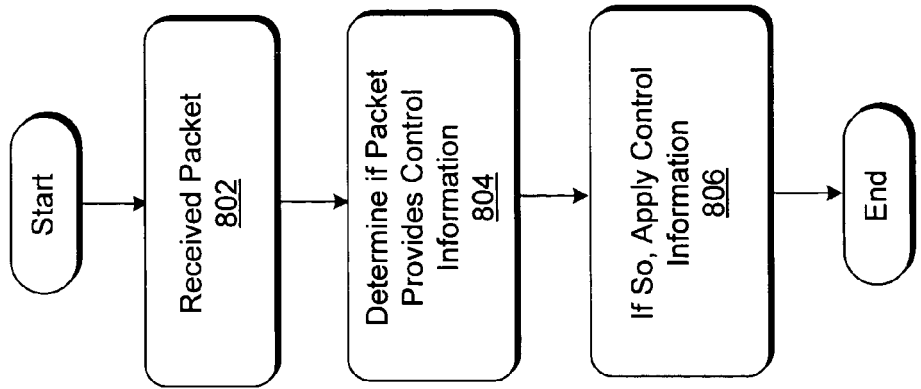
FIG. 8 shows an exemplary procedure in flowchart form for interpreting received control information in the stream produced in FIG. 7.
Figure 7:
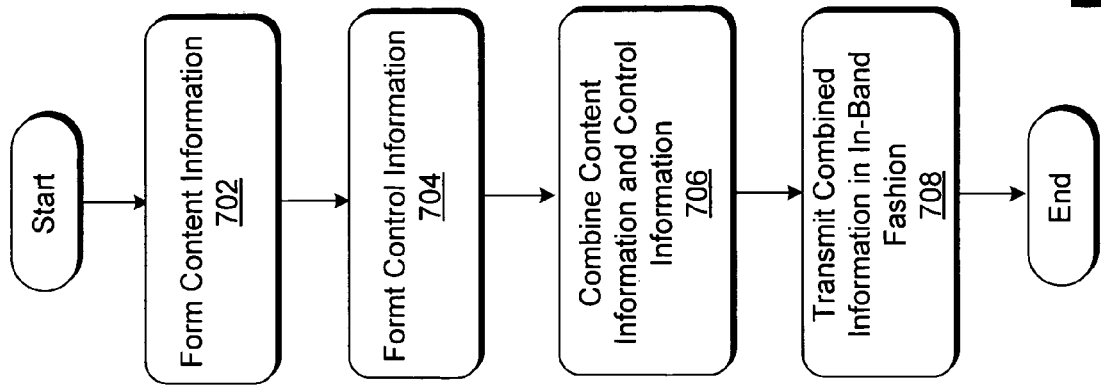
FIG. 7 shows an exemplary procedure in flowchart form for creating a stream including both content information and control information.

FIGS. 7 and 8 describe the operation of the system 100 of FIG. 1 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

FIG. 7 describes a procedure for creating the stream 124 containing both content information 126 and control information 128.

In step 702, the host module 102 forms the content information 126. This may involve collected the content information from the sources 108 and optionally performing processing on it to place it in desired form for transmission.

In step 704, the host module 102 forms the control information 128. The host module 102 forms the control information when prompted to do so by various circumstances, such as to signal the end of a stream, to signal the use of a new key, to signal the presence of a discontinuity, and so forth. In one subset of cases, the host module 102 forms the control information because it is prompted to do so by actions taken by the user 112 who is interacting with the client module 104 or the host module 102.

In step 706, the transfer processing module 122 of the host module 102 combines the content information 126 with the control information 128. This can be performed by inserting the control information 128 into a multiplexed stream of packets containing content information (e.g., A/V information).

In step 708, the transfer processing module 122 transfer the stream 124 to the client module 104, where the stream 124 includes both content information 126 and control information 128.

The procedure shown in FIG. 8 is used to interpret and act on control information present in the received stream 124.

In step 802, the reception processing module 134 receives the stream 124 containing in-band control information 128.

In step 804, the reception processing module 134 determines whether a received packet from the stream 124 includes control information. This can be performed by examining the header information of the packet to determine if it contains information that indicates that it contains control information.

In step 806, the client module 104 performs processing of the received content information 126 based on the control information 128. Such processing can take the form of any of operations described above with reference to FIGS. 4-6. For example, the control information 128 may inform the client module 104 that it should use certain rendering resources or decryption keys to process the received content information. In the case of a stream discontinuity, the client module 104 may be discarding packets until it receives stream boundary control information, upon which time it commences refilling its buffers (e.g., buffer 218).

C. Exemplary Computer Environment

In one exemplary implementation, both the host module 102 and the client module 104 can be implemented by two computer devices that are appropriately configured to act in a host and client capacity, respectively. In this case, FIG. 9 provides information regarding an exemplary computer environment 900 that can be used to implement either the host module 102 or the client module 104.

The computing environment 900 includes a general purpose type computer 902 and a display device 904. However, the computing environment 900 can include other kinds of computing equipment. For example, although not shown, the computer environment 900 can include hand-held or laptop devices, set top boxes, game consoles, extension-type computers, mainframe computers, logic functionality embedded in rendering devices, and so forth. Further, FIG. 9 shows elements of the computer environment 900 grouped together to facilitate discussion. However, the computing environment 900 can employ a distributed processing configuration. In a distributed computing environment, computing resources can be physically dispersed throughout the environment.

Exemplary computer 902 includes one or more processors or processing units 906, a system memory 908, and a bus 910. The bus 910 connects various system components together. For instance, the bus 910 connects the processor 906 to the system memory 908. The bus 910 can be implemented using any kind of bus structure or combination of bus structures, including a memory bus or memory controller, a peripheral bus, an accelerated graphics port, and a processor or local bus using any of a variety of bus architectures.

Computer 902 can also include a variety of computer readable media, including a variety of types of volatile and non-volatile media, each of which can be removable or non-removable. For example, system memory 908 includes computer readable media in the form of volatile memory, such as random access memory (RAM) 912, and non-volatile memory, such as read only memory (ROM) 914. ROM 914 includes an input/output system (BIOS) 916 that contains the basic routines that help to transfer information between elements within computer 902, such as during start-up. RAM 912 typically contains data and/or program modules in a form that can be quickly accessed by processing unit 906.

Other kinds of computer storage media include a hard disk drive 918 for reading from and writing to a non-removable, non-volatile magnetic media, a magnetic disk drive 920 for reading from and writing to a removable, non-volatile magnetic disk 922 (e.g., a "floppy disk"), and an optical disk drive 924 for reading from and/or writing to a removable, non-volatile optical disk 926 such as a CD-ROM, DVD-ROM, or other optical media. The hard disk drive 918, magnetic disk drive 920, and optical disk drive 924 are each connected to the system bus 910 by one or more data media interfaces 928. Alternatively, the hard disk drive 918, magnetic disk drive 920, and optical disk drive 924 can be connected to the system bus 910 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 930, application modules 932, other program modules 934, and program data 936.

The computer environment 900 can include a variety of input devices. For instance, the computer environment 900 includes the keyboard 938 and a pointing device 940 (e.g., a "mouse") for entering commands and information into computer 902. The computer environment 900 can include other input devices (not illustrated), such as a microphone, joystick, game pad, satellite dish, serial port, scanner, card reading devices, digital or video camera, etc. Input/output interfaces 942 couple the input devices to the processing unit 906. More generally, input devices can be coupled to the computer 902 through any kind of interface and bus structures, such as a parallel port, serial port, game port, universal serial bus (USB) port, etc.

The computer environment 900 also includes the display device 904. A video adapter 944 couples the display device 904 to the bus 910. In addition to the display device 904, the computer environment 900 can include other output peripheral devices, such as speakers (not shown), a printer (not shown), etc. Any of these units can constitute the target entities (120, 122, . . . 124) shown in FIG. 1.

Computer 902 operates in a networked environment using logical connections to one or more remote computers, such as a remote computing device 946. The remote computing device 946 can comprise any kind of computer equipment, including a general purpose personal computer, portable computer, a server, a game console, a network extension device, and so forth. Remote computing device 946 can include all of the features discussed above with respect to computer 902, or some subset thereof.

Any type of network 948 can be used to couple the computer 902 with remote computing device 946, such as a WAN, a LAN, etc. The computer 902 couples to the network 948 via network interface 950, which can utilize broadband connectivity, modem connectivity, DSL connectivity, or other connection strategy. Although not illustrated, the computing environment 900 can provide wireless communication functionality for connecting computer 902 with remote computing device 946 (e.g., via modulated radio signals, modulated infrared signals, etc.).

In one implementation, the computer 902 and computer 946 can correspond to the host module 102 and client module 104, respectively. In another implementation, the computer 902 and computer 946 can correspond to the host module 102 and source 108, respectively (where the source 108 can constitute a server computer). Still other applications are possible.

In closing, a number of examples were presented in this disclosure in the alternative (e.g., case A or case B). In addition, this disclosure encompasses those cases which combine alternatives in a single implementation (e.g., case A and case B), even though this disclosure may not have expressly mentioned these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for streaming content information from a host module to a client module, comprising:
   providing, at the host module, units of content information for inclusion in a stream to be transmitted to the client module;
   providing, at the host module, at least one unit of control information for inclusion in the stream;
   inserting, at the host module, said at least one unit of control information among the units of content information, wherein a position of said at least one unit of control information vis-á-vis the units of content information conveys instructions regarding a manner in which the client module is to operate upon receiving the control information; and
   transmitting, by the host module, the stream containing the units of content information and said at least one unit of control information to the client module, wherein the host module dynamically varies the control information that it inserts in the stream based on actions taken by a user who controls a playback of the stream.

2. The method of claim 1, wherein said at least one unit of control information is positioned at a tail end of a group of units of content information.

3. The method of claim 2, wherein said at least one unit of control information conveys end of stream (EOS) information pertaining to the group of units of content information.

4. The method of claim 1, wherein said at least one unit of control information is positioned at a head end of a group of units of content information.

5. The method of claim 4, wherein said at least one unit of control information conveys aspects of rendering functionality to be applied to the group of units of content information.

6. The method of claim 4, wherein said at least one unit of control information conveys an instruction to change a decryption key for application to the group of units of content information.

7. The method of claim 1, wherein said at least one unit of control information is positioned between two groups of units of content information.

8. The method of claim 7, wherein said at least one unit of control information conveys information regarding a discontinuity between the two groups of units of content information.

9. The method of claim 8, wherein the discontinuity is indicative of the transition from one stream to another stream, as instructed by the user.

10. The method of claim 9, wherein the transition from one stream to another stream represents a movement, as instructed by the user, from one program to another program on respective channels.

11. The method of claim 9, wherein the transition from one stream to another stream represents a movement, as instructed by the user, from one portion of a stream to another portion of the same stream.

12. The method of claim 1, further comprising:
   receiving, at the client module, the stream containing said at least one unit of control information and the units of content information;
   detecting a presence of said at least one unit of control information in the stream; and
   applying the control information contained in said at least one unit of control information to govern operation of the client module.

13. The method of claim 12, wherein the applying comprises pausing the client module in response to the receipt of end of stream instructions contained within said at least one unit of control information.

14. The method of claim 12, wherein the applying comprises applying a decryption key to subsequent processing of received content information, in response to the receipt of encryption related instructions contained within said at least one unit of control information.

15. The method of claim 12, wherein the applying comprises resuming a refill of a client module buffer in response to a receipt of stream boundary instructions contained within said at least one unit of control information.

16. The method of claim 1, wherein the units of content information and said at least one unit of control information comprise packets having a similar format.

17. The method of claim 16, wherein the packets include identification information that indicates whether the packets include content information or control information.

18. The method of claim 1, wherein the content information comprises audio/visual information.

19. A computer readable media having stored thereon machine readable instructions for implementing the method of claim 1.

20. A host module for streaming content information to client module, comprising:
   a transfer processing module configured to:
      provide units of content information for inclusion in a stream to be transmitted to the client module;
      provide at least one unit of control information for inclusion in the stream;
      insert said at least one unit of control information among the units of content information, wherein a position of said at least one unit of control information vis-á-vis the units of content information conveys instructions regarding a manner in which the client module is to operate upon receiving the control information; and
      transmit the stream containing the units of content information and said at least one unit of control information to the client module, wherein the host module dynamically varies the control information that it inserts in the stream based on actions taken by a user who controls a playback of the stream.

21. A system for transmitting content information between a host module and a client module, comprising:
a host module configured to:
provide units of content information for inclusion in a stream to be transmitted to the client module;
provide at least one unit of control information for inclusion in the stream;
insert said at least one unit of control information among the units of content information, wherein a position of said at least one unit of control information vis-á-vis the units of content information conveys instructions regarding a manner in which the client module is to operate upon receiving the control information; and
transmit the stream containing the units of content information and said at least one unit of control information to the client module,
a reception module configured to:
receive, from the host module, the stream containing said at least one unit of control information positioned among units of content information;
detect the presence of said at least one unit of control information in the stream; and
apply the control information contained in said at least one unit of control information to govern the manner in which the client module operates,
wherein the host module dynamically varies the control information that it inserts in the stream based on actions taken by a user who controls a playback of the stream.

22. The system of claim 21, wherein the client module is implemented as an extension unit coupled to the host module, wherein the extension unit is configured to receive content information from the host module.

* * * * *